C. M. PIDGEON.
ATTACHMENT FOR SURVEYING INSTRUMENTS OR TRANSITS.
APPLICATION FILED MAY 9, 1910.
989,288.
Patented Apr. 11, 1911.
2 SHEETS—SHEET 1.
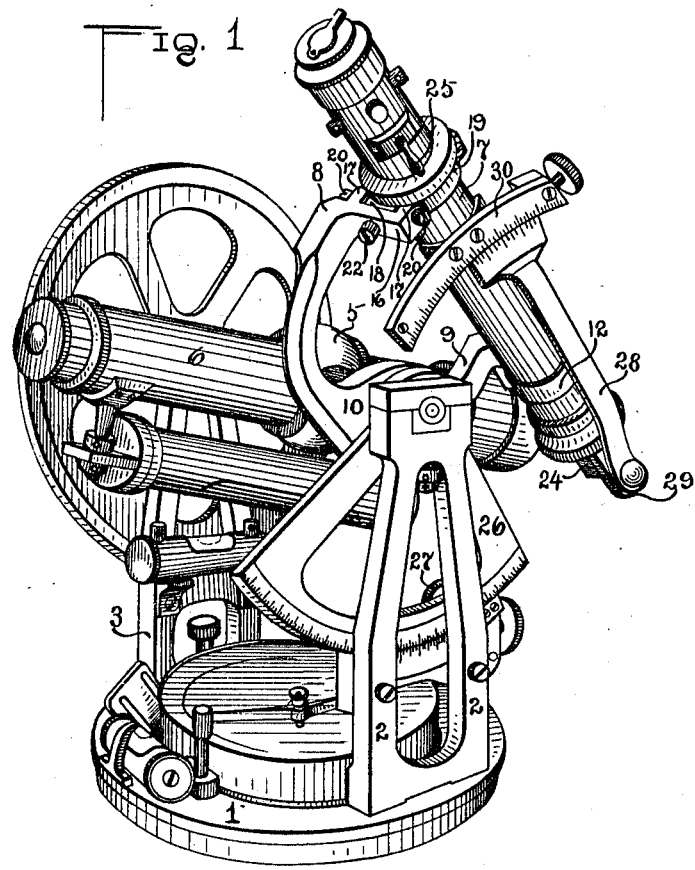
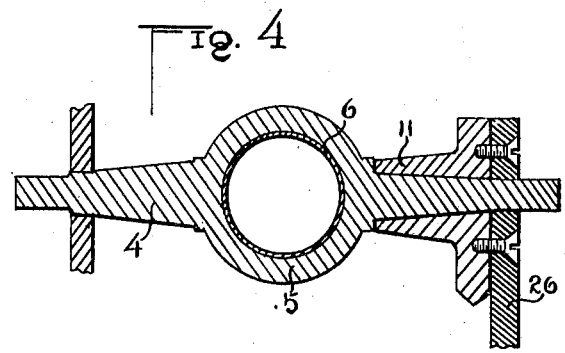

C. M. PIDGEON.
ATTACHMENT FOR SURVEYING INSTRUMENTS OR TRANSITS.
APPLICATION FILED MAY 9, 1910.
989,288.
Patented Apr. 11, 1911.
2 SHEETS—SHEET 2.
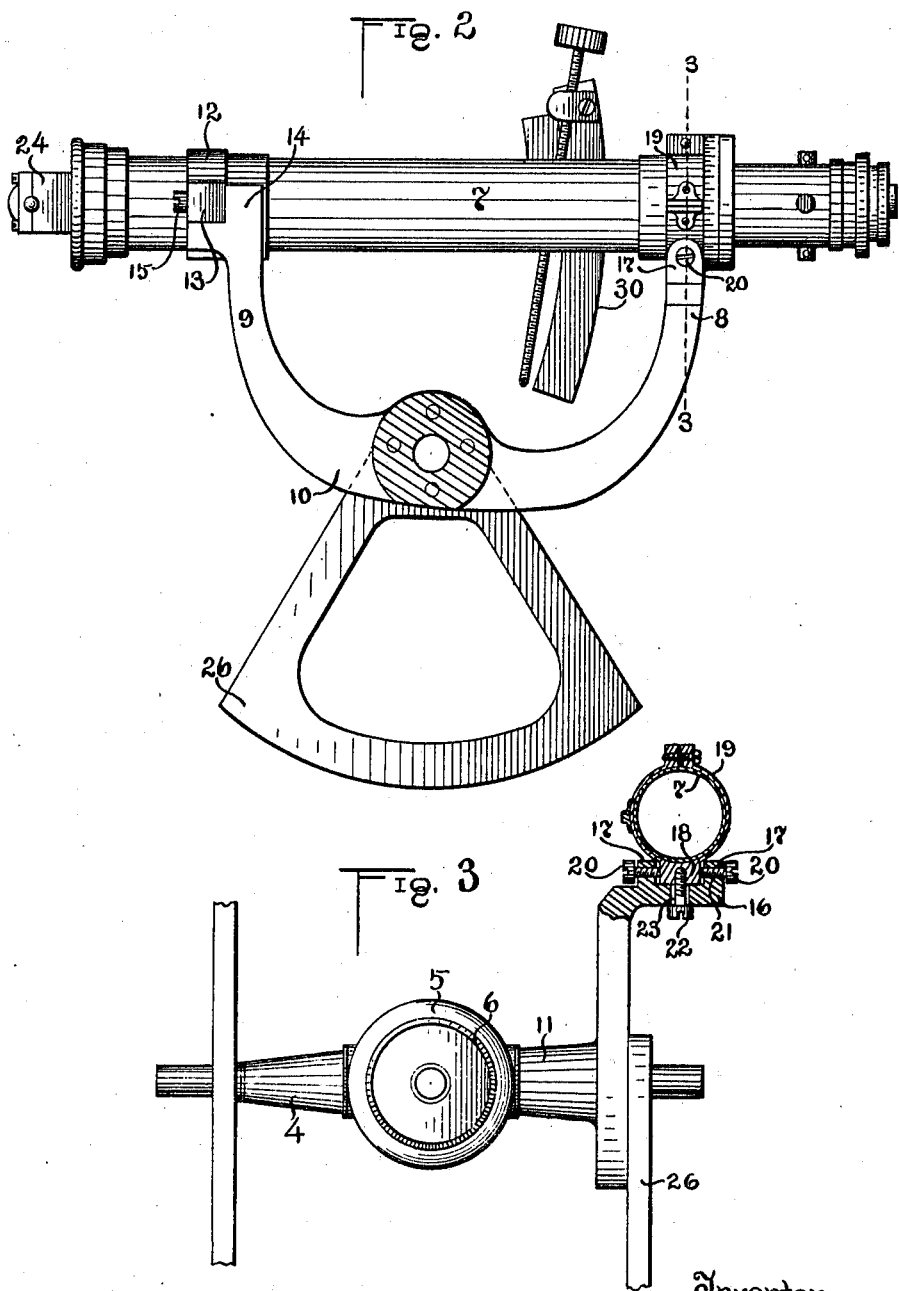

UNITED STATES PATENT OFFICE.

CHARLES MARSHALL PIDGEON, OF WASHINGTON, DISTRICT OF COLUMBIA.

ATTACHMENT FOR SURVEYING INSTRUMENTS OR TRANSITS.

989,288.  Specification of Letters Patent.  Patented Apr. 11, 1911.

Application filed May 9, 1910. Serial No. 560,142.

*To all whom it may concern:*

Be it known that I, CHARLES M. PIDGEON, a citizen of the United States, residing at Washington, District of Columbia, have invented certain new and useful Improvements in Attachments for Surveying Instruments or Transits; and I do hereby declare the following to be a full, clear, and exact description of the invention, such as will enable others skilled in the art to which it appertains to make and use the same.

My invention relates to new and useful improvements in attachments for surveying instruments or transits and my object is to provide means for mounting the solar telescope on the same axis with the main or transit telescope and at the same time render said parts adjustable independently of each other.

A further object is to provide a supporting bracket for the solar telescope, whereby said solar telescope will be so disposed in position as to be readily manipulated, and, a further object is to provide means for adjusting the solar telescope on its supporting bracket, whereby the line of sight in the solar telescope may be made and kept parallel with the plane of the line of sight in the transit telescope.

Other objects and advantages will be hereinafter referred to and more particularly pointed out in the specification and claims.

In the accompanying drawings which are made a part of this application, Figure 1 is a perspective view of the instrument complete. Fig. 2 is a detail view partly in section showing the supporting bracket for the solar telescope. Fig. 3 is a sectional view as seen on line 3—3 Fig. 2, and, Fig. 4 is a vertical longitudinal sectional view through the supporting shaft for the transit telescope and the solar telescope.

Referring to the drawings in which similar reference numerals designate corresponding parts throughout the several views, 1 indicates the limb or horizontal alidade plate of the transit proper, extending upwardly from which are standards 2 and 3, in the upper ends of said standards having suitable bearings to receive the ends of a shaft 4.

The central portion of the shaft 4 is provided with a socket, 5, through which the main or transit telescope 6 extends and as the shaft is rotatably mounted in its bearings, said telescope may be rotated freely upwardly and downwardly or turned end for end, as occasion may require. In connection with the transit telescope, I provide a solar telescope 7, which latter telescope is mounted upon arms 8 and 9 of a yoke or frame 10, said yoke having a sleeve 11 formed integral therewith, which is adapted to extend over a portion of the shaft 4, that portion of the shaft entering the sleeve being preferably tapered, as is also the opening in the sleeve, thereby providing a perfect adjustment for the sleeve on the shaft. The arm 9 is attached to the solar telescope 7 by providing said telescope with a band 12 and extending laterally from said band is a bar 13 which enters a crotch 14 at the upper end of the arm 9, said bar being secured to parts of the crotch by means of a screw 15 or other suitable device. The upper end of the arm 8 is provided with a lateral extension 16, which projects below the telescope 7 and has upwardly projecting ears 17 thereon, which are spaced apart, and between said ears is introduced a lug 18 carried by a collar 19, which collar is in turn clamped or otherwise secured around the solar telescope and in which the telescope may be revolved. The width of the lug 18 is less than the distance between the ears 17, so that the end of the telescope 7 may be readily adjusted to make or maintain the line of sight thereof parallel with the vertical plane of the line of sight of the transit telescope.

In order to obtain a minute adjustment of the solar telescope 7, adjusting screws 20 are introduced into threaded sockets 21 in the ears 17, while the lug and the telescope attached thereto are normally held in their adjusted positions by a set screw 22, which set screw is introduced through a slot 23 in the lateral extension 16 and into the lug 18, the length of the slot being greater than the diameter of the set screw, thereby permitting the lateral adjustment of the lug and the set screw.

The solar telescope is provided at one end with a reflector 24, which is used in casting the sun's rays into the solar telescope and as the position of the sun changes from east to west it becomes necessary to rotate the solar telescope in order to obtain the proper reflection into the telescope, for which reason the telescope is provided with a handle 25 so that the telescope can be readily rotated in the band 12 and collar 19. It is also necessary to rotate the solar telescope around the shaft 4 to obtain the proper effect of the sun's rays on the reflector as the position of the instrument is changed in latitude, and, as the yoke carrying the solar telescope is mounted upon the shaft independently of the transit telescope, the solar telescope may be tilted independently of the transit telescope. The tilting of the telescope obtains the latitude, and, by providing an arc 26 and placing thereon the proper graduations, the latitude can be properly read from said arc when the solar telescope is properly adjusted or the solar telescope may be given the proper pitch for the latitude of the place. The solar telescope is held in its adjusted position in any suitable manner as by providing a binding screw 27, which is adapted to engage the latitude arc 26 and hold said arc against swinging movement until the binding screw is again loosened.

To obtain the proper declination of the reflector 24, an arm 28 is attached to the reflector 24 carrying an index or vernier at its opposite end, said reflector and arm being pivotally mounted on a shank 29 extending outwardly from the end of said solar telescope and by fixing the reflector to the arm 28, said reflector will be moved with the swinging of the arm. A declination arc 30 is attached to the solar telescope 7 and is provided with graduations and with said arc and graduations coöperates the index or vernier on the end of the arm 28, whereby the exact declination of the reflector 24 may be read.

The main object of my invention is the adjustable feature of the solar telescope, as a great amount of trouble has been encountered by the line of sight between the two telescopes becoming disarranged and in view of the fact that the one hundredth part of an inch of variation will destroy the value of the instrument, the value of the invention will be readily apparent. It will further be seen that the most minute adjustment can be obtained by employing the form of adjusting mechanism herein shown and it will further be seen that by mounting the two telescopes in the manner shown, they can be adjusted independently of each other and the position of either maintained, while the other is being operated. It will further be seen that by mounting the solar telescope upon the arms of the yoke, as shown, said telescope can be freely rotated around the axle, as well as pivoted in its bearings without the declination arc engaging with any parts of the instrument and the solar telescope can be rotated in its bearings when tilted in any position.

In all solar attachments for transit instruments heretofore made, the lack of rigidity of the attachment, the difficulty of accurate adjustment and of maintaining the adjustment under the usage to which the instrument is necessarily subjected in field work is so great as to greatly limit their general use and bring this class of instruments into disfavor with field engineers.

As is apparent to those skilled in the art, the following adjustments are necessary. 1st. That the class of solar attachments herein represented be so adjusted as to bring the reflector 24 into such a position that, with the vernier graduations on the arm of the reflector 28 reading 0° on the declination arc 30, the reflector 24 shall be truly at 45° with the line of sight or collimation through the solar telescope 7. 2nd. To bring the line of sight or collimation through the solar telescope 7 to a right angle with the axis 4, upon which the solar telescope revolves, so that, as it is tilted or revolved about its axis 4, the line of sight through the solar telescope will generate a plane surface. 3rd. To bring the line of sight or collimation through the solar telescope and the plane generated by the revolution thereof parallel to the plane of revolution of the line of sight or collimation through the main or transit telescope.

The first is accomplished as follows: After having established the line of sight through the solar telescope in the center of revolution of same in its collars 12 and 19, by swinging the reflector arm 28 so that the reflector 24 is placed edgewise to the line of sight through the solar telescope, in which position sufficient light passes directly to the objective on either side of the reflector to form the image, and executing the adjustment by rotating the solar telescope in its collars 12 and 19 in a manner similar to a like adjustment of a Y level, the main transit telescope is set on a defined point and by rotating same on its axis, another defined point is established on the opposite side of the transit, so that the straight line connecting the two points passes through the center of the instrument. Offsets are now made from these two established points, which offsets are equal to the horizontal distance from the solar telescope reflector 24, when in a horizontal position, to the center of the axis of the transit telescope, upon which the solar apparatus revolves. The straight line connecting these two points thus established passes through the reflector 24, when the same is horizontal and in a position perpendicular to a vertical plane passing through said line. The adjustment is accomplished by rotating the reflector 24 in such a manner that when one point is seen reflected in the reflector 24, the other point can be seen by rotating the solar telescope in its collars 12 and 19 through the angle of 180°. In such a position, the reflector 24 would be at an angle of 45° with the line of sight through the solar telescope, and the declination arc reading would be 0°, when the instrument is properly adjusted.

The second and third adjustments are taken care of by my improvement, which together with the rigidity of the mounting enables the user to obtain accurate adjustments constantly.

What I claim is:—

1. The combination with a surveyor's transit having a telescope and a rotatably mounted shaft carrying said telescope, of a solar telescope, means for mounting said solar telescope on the shaft with the first telescope and independently movable thereon and means to adjust the solar telescope to maintain the line of sight thereof parallel with the vertical plane of the line of sight of the first mentioned telescope.

2. The combination with a surveyor's transit having a main telescope, and a shaft carrying said telescope and rotatably mounted upon parts of the transit, of a solar telescope, a yoke rotatably mounted on said shaft and means to secure the solar telescope to the yoke and adjust the same laterally thereon to cause the line of sight in the solar telescope to be parallel with the vertical plane of the line of sight in the main telescope.

3. In a surveyor's transit, the combination with a main telescope and a shaft carrying said telescope, said shaft being rotatably mounted on parts of the transit, of a solar telescope, a yoke rotatably mounted on said shaft and carrying said solar telescope, a lug depending from the solar telescope and adjusting screws carried by parts of the yoke and coöperating with said lug to adjust the solar telescope laterally.

4. In a surveyor's transit, the combination with a rotatably mounted shaft and a telescope carried by said shaft, of a yoke rotatably mounted on said shaft, said yoke having arms extending upwardly therefrom, ears on one of said arms, a solar telescope mounted on said arms, a lug depending from said solar telescope and extending between said ears, adjusting screws extending through said ears and engaging said lug and a binding screw extending through the arm having ears thereon and engaging the lug to lock the solar telescope in its adjusted position.

5. The combination with a surveyor's transit having a telescope mounted thereon and a shaft carrying said telescope, of a solar telescope, a yoke rotatably mounted on said shaft, means to adjustably mount the solar telescope on said yoke and an arc depending from said yoke and having graduations thereon and means to lock the arc in its adjusted position.

6. The combination with a surveyor's transit having a telescope and a shaft supporting said telescope, portions of said shaft being tapered, of a yoke having a sleeve thereon adapted to engage the tapered portion of the shaft, arms extending upwardly from said yoke, one of which arms is provided with a lateral extension, said extension having ears projecting therefrom and a slot therethrough, a solar telescope mounted on said arms, adjusting screws extending through said ears and engaging parts of the telescope and a set screw extending through said slot and engaging parts of the solar telescope to hold the same in its adjusted position.

In testimony whereof I have signed my name to this specification in the presence of two subscribing witnesses.

CHARLES MARSHALL PIDGEON.

Witnesses:
A. G. HOLDER, Jr.,
A. J. McROBERTS, Jr.